Oct. 11, 1949. L. E. SOLDAN 2,484,191
VIBRATORY EQUIPMENT
Filed Jan. 6, 1945 2 Sheets-Sheet 2

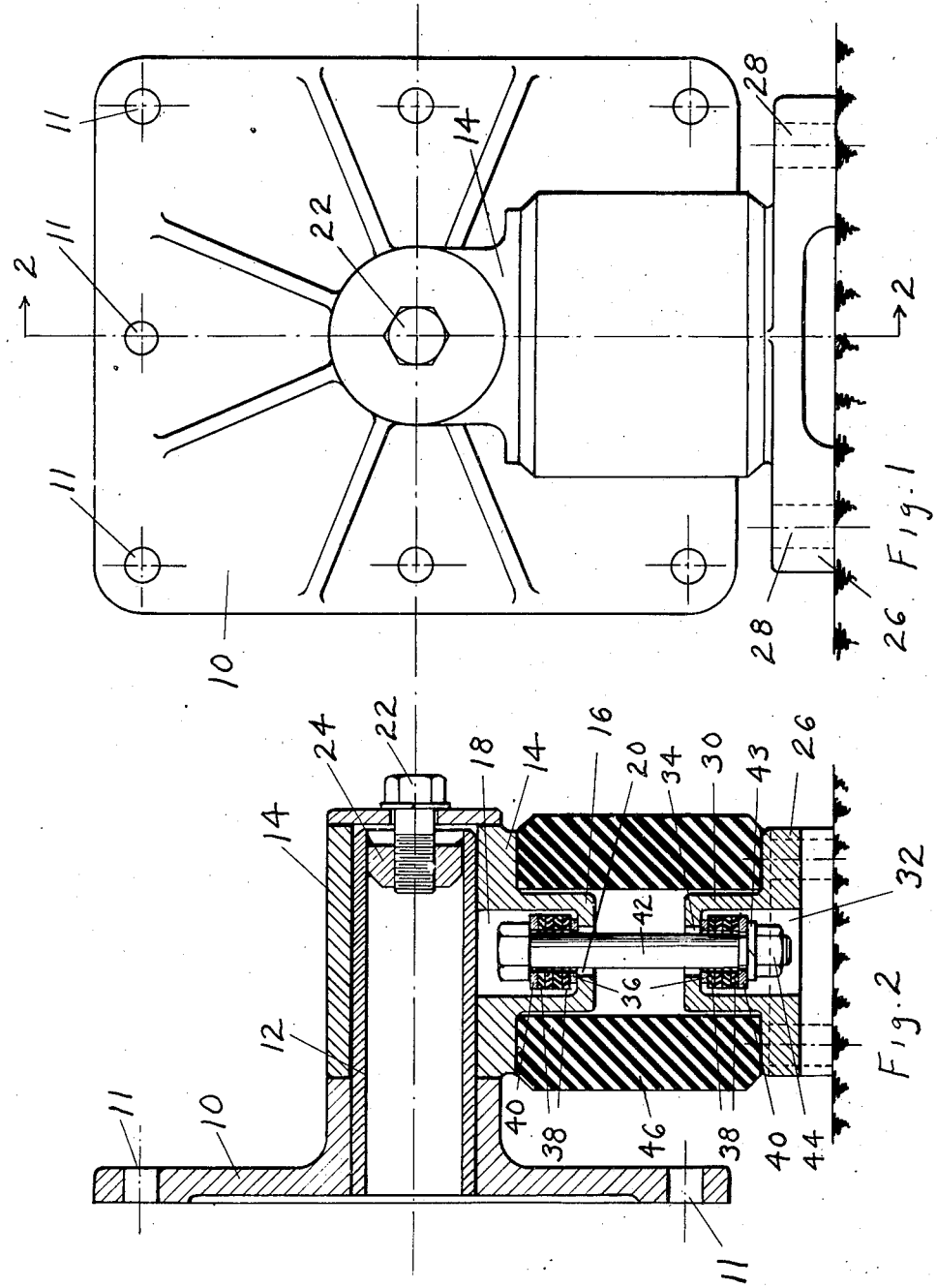

INVENTOR.
Lewis E. Soldan
BY Roy M. Eilers
ATTORNEY

Patented Oct. 11, 1949

2,484,191

UNITED STATES PATENT OFFICE 2,484,191

VIBRATORY EQUIPMENT

Lewis E. Soldan, Chicago, Ill.

Application January 6, 1945, Serial No. 571,682

3 Claims. (Cl. 248—22)

This invention relates to improvements in vibratory equipment. More particularly, the invention relates to improvements in mounting devices for vibratory equipment.

It is an object of the present invention to provide an improved mounting device for vibratory equipment.

Vibratory equipment is usually provided with a material-carrying platform or bed that is vibrated by a suitable mechanism. The platform or bed preferably is supported in such a manner that it can vibrate between resiliently maintained limits. Such a support is highly desirable because it permits relatively free movement of the vibrating equipment at small amplitudes of vibration, and provides a progressive increase in limitation of freedom of movement at large amplitudes of vibration. This progressive increase in limitation of freedom of movement at larger amplitudes of vibration is due to the fact that the resistance to movement progressively increases with the amount of movement. As a result of the use of this type of support, it is possible to provide relatively free movement of the vibrating equipment at small amplitudes without permitting undue vibration of that equipment. The relatively free movement at small amplitudes is necessary to permit the vibratory equipment to do the work for which it is intended, and the prevention of undue vibration is necessary to prevent injury to the equipment and to the material being vibrated. It is therefore an object of the present invention to provide a mounting device for vibratory equipment that permits vibration of the vibratory equipment between resiliently maintained limits.

At present, vibratory equipment is customarily equipped with springs that permit the equipment to have a controlled vibration. These springs resiliently support the vibratory equipment and usually hold the vibratory equipment away from a support thereby permitting the device to vibrate without touching the support. The use of springs, however, is not completely satisfactory, because springs cannot simultaneously give the desired resiliency and a desired amount of resistance to transverse movement of the equipment. A satisfactory mounting device for vibratory equipment must be resilient enough to permit the equipment to vibrate, and must be inflexible enough to prevent swinging or swaying of the vibratory equipment. The springs that are now in use can be made resilient enough, but if they are so made they cannot prevent the swaying of the vibratory equipment. This swaying can be quite objectionable since it may interfere with the proper vibration of the equipment. The present invention obviates this objection by providing a resilient mounting that will give the desired resilience and will also give the desired resistance to side thrust. It is, therefore, an object of the invention to provide an improved resilient mounting device for vibratory equipment.

It is often desirable to change the attitude or position of vibratory equipment. Where such equipment is spaced away from a support by springs, a change in the attitude or position of the vibratory equipment can only be obtained by changing the length of the springs or by changing the position of the support. Changing of the length of spring is objectionable because it will increase or decrease the force exerted by the spring, and changing of the position of the support may involve considerable carpentry work. Accordingly, it is not very easy to change the attitude or position of vibratory equipment, where that equipment is supported by present day methods of support. Particularly is this true where the vibratory equipment is quite massive, and the support must also be quite massive. By use of the present invention it is possible to change the attitude or position of vibratory equipment with a minimum amount of work. It is therefore an object of the present invention to provide mounting devices for vibratory equipment that are arranged to facilitate a change in the position of the vibratory equipment without changing the position of the support for that equipment.

Other objects and advantages of the invention will become apparent to those skilled in the art from an examination of the drawing and accompanying description.

In the drawing and accompanying description two preferred forms of the invention are shown and described, but it is to be understood that the drawing and accompanying description do not limit the invention and the invention will be defined by the appended claims.

In the drawing

Fig. 1 is a side elevational view of one preferred form of mounting device,

Fig. 2 is a cross-sectional view of the mounting device shown in Fig. 1 and is taken along the plane 2—2.

Figure 3:
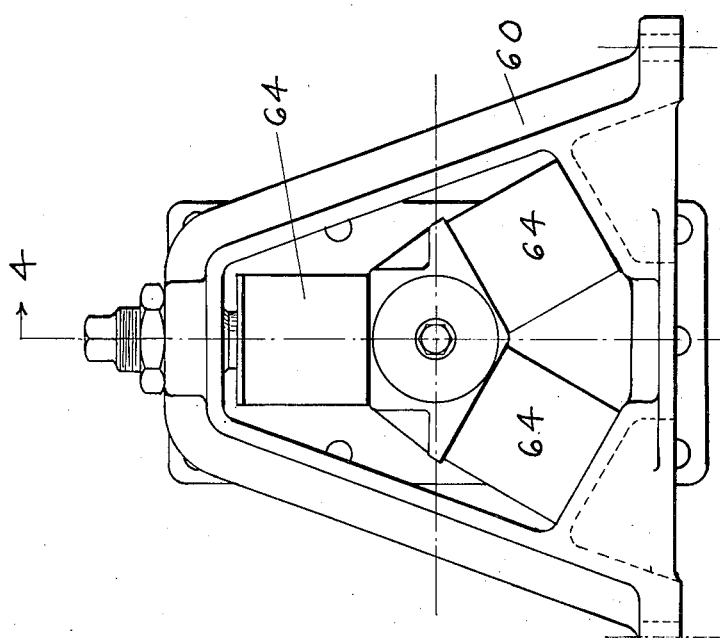
Fig. 3 is a side elevational view of another preferred form of mounting device.

Referring to the drawing in detail, a flange that may be secured to the platform or bed of vibratory equipment is denoted by the numeral 10. This flange 10 has a plurality of holes 11 and also has a projection 12 that may be secured to it by any means known to those skilled in the art. A few of such means are welding, threading and shrinking the flange 10 onto the projection 12, and they permanently secure projection 12 to flange 10. As a result the projection 12 and the flange 10 and the vibratory equipment move and vibrate as a unit and the projection 12 may be said to be a projection on said equipment. The projection 12 engages and is supported by a holding means 14 which has a substantially cylindrical projection 16. Where it is used in this description, the phrase "substantially cylindrical" does not require the projection to be circular in cross section although it may have that shape, but merely means a construction formed by the translation of a line parallel to itself to preferably form a three dimensional object. The projection 16 has a recess 18 therein and an opening 20 in the end of the recess 18. The projection 12 is secured to the holding means 14 by a bolt 22 that engages a threaded member 24 which is welded or otherwise secured to projection 12. Positioned below the holding means 14 is a base 26 which serves to support the vibratory equipment and to secure it to a suitable foundation. The base 26 has openings 28 therein to receive bolts or other securing means. The base 26 also has a substantially cylindrical projection 30 that extends upwardly toward the projection 16 on the holding means 14. The projection 30 has a recess 32 and an opening 34 in the end of the recess 32. Adjacent to the openings 20 and 34 and bearing against the ends of recesses 18 and 32 of holding means 14 and base 26, are inflexible washers 36 that may be made of metal or any other sturdy material. Positioned adjacent to and in contact with the washers 36 are a plurality of washers of resilient material 38. These washers may be made of rubber, synthetic rubber, leather, plastics or any other material having a sufficient amount of resiliency. Positioned adjacent to and in contact with the washers 38 are inflexible washers 40 that may be made of metal or other sturdy material. The washers 36, 38 and 40 are so arranged that the inflexible washers 36 and 40 are oppositely disposed of and confine the resilient washers 38. Extending through the washers 36, 38 and 40 and the openings 20 and 34 in the ends of recesses 18 and 32 of holding means 14 and base 26 is a bolt 42. A washer 43 and nut 44 are secured to the end of the bolt 42 and can be used to determine the distance between the ends of recesses 18 and 32. Enclosing the substantially cylindrical projections 16 and 30 of holding means 14 and base 26 is a sleeve 46 of resilient material. This sleeve directly engages a portion of base 26 and a portion of holding means 14 and thereby resiliently spaces them apart. The sleeve 46 is preferably made rather thick to enable it to resist any side motion of the vibratory equipment. This resistance to side motion is increased by the appreciable height of the projections 16 and 30 of the holding means 14 and base 26. Additional resistance to side motion of the vibratory equipment is provided by the intimate engagement between the washers 36 and the recesses 18 and 32 of projections 16 and 30 of holding means 14 and base 26.

The proper amount of compression can be exerted on the resilient sleeve 46 and the resilient washers 38 by proper adjustment of the nut 44. This compressive force may best be determined for any particular case by experimentation. Where desired the nut 44 may be castellated and the bolt 42 may be provided with openings therethrough to receive suitable pins for more permanent securement between the nut 44 and bolt 42.

When the vibratory equipment, to which the flange 10 is secured by bolts extending through openings 11, moves it will move the flange 10 and projection 12 up and down. The base 26 will be secured to a substantially stationary support such as a foundation or floor and will remain substantially fixed. To permit the proper amount of vibratory movement between the flange 10 and the base 26, the resilient sleeve 46 and resilient washers 38 are needed. If the flange 10 tends to move down with the vibratory equipment, the sleeve 46 will compress to some extent and absorb the kinetic energy of the flange. It will then expand and cause the flange to move upwardly. As the flange 10 moves down compressing the sleeve 46, it permits the washers 38 to expand, and when the flange moves up permitting the sleeve 46 to expand and it causes the washers 38 to compress. This compressing of the washers 38 will absorb the kinetic energy of the flange 10 and will halt its upward movement. In this way, the flange 10 and the projection 12 on the vibratory equipment floats between the two resilient means.

The sleeve 46 is made sturdy enough to support its proportionate share of the weight of the vibratory equipment, and all of the weight of the vibratory equipment can be supported solely by the respective sleeves. These sleeves are confined by the base 26, the holding means 14, and the bolt 42, and can not get out of position. The washers 38 are similarly confined by the base 26, holding means 14 and bolt 42 and cannot get out of position. Accordingly it can be seen that the invention provides a very sure although simple means of resiliently supporting vibratory equipment.

Figure 4:
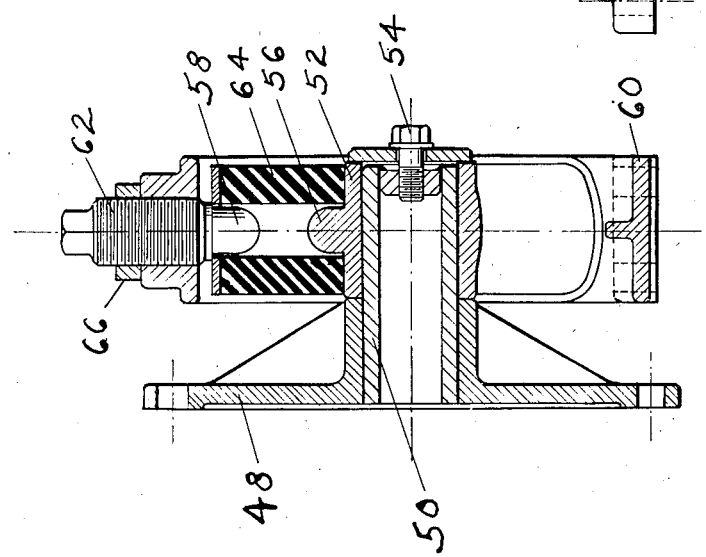
Fig. 4 is a cross-sectional view of the mounting device shown in Fig. 3 and is taken along the plane 4—4.

In Figs. 3 and 4 another preferred form of mounting device for vibratory equipment is shown. In this form the flange secured to the vibratory equipment is denoted by the numeral 48 and it carries a projection 50. The projection 50 is received and carried by a holding means 52 to which it is secured by bolt 54. The holding means 52 has a plurality of projections 56 thereon that are in register with similar projections 58 on the base 60. In the form shown in the drawing there are three projections 56 and three projections 58 that are in register. The projection 58 at the top of the base 60 is movable relative to said base by the rotation of bolt 62 which determines the compression in the various resilient sleeves 64 that space holding means 52 away from base 60. The bolt 62 may be provided with a means to secure it in the desired position and one such means is shown. This means is the nut 66 that can be set to prevent rotation of bolt 62.

The sleeves 64 enclose the projections 56 and 58 of the holding means 62 and base 60. The sleeves 64 are relatively thick and cooperate with the projections 56 and 58 on holding means 52 and base 60 to resist sideways motion of the vibratory equipment. The sleeves 64 carry their proportionate share of the weight of the vibratory equipment and sleeves constitute the sole means of supporting the vibratory equipment.

The amount of compression in the sleeves 64 can be adjusted by rotation of bolt 62 and may be set at any desired value. When the flange moves down it will compress the two lower sleeves 64 and will permit the upper sleeve 64 to expand. This compression will absorb the kinetic energy of the flange and will cause a subsequent upward movement of the flange. This upward movement will cause a compression of the upper sleeve 64 and an expansion of the lower sleeves 64, and in this way the flange 48 and the projection 50 will float between the sleeves 64.

In both preferred forms of the invention, the projections 12 and 50 are respectively secured to the holding means 14 and 52 by bolts 22 and 54. The bolts 22 and 54 can be set to force the holding means 14 and 52 against the edges of flanges 10 and 48. This causes a frictional engagement that prevents relative movement between the holding means and the projections and flanges. Where it is desired to change the attitude or position of the vibratory equipment, the operator need only loosen bolts 22 and 54, thereby releasing the frictional engagement between the flanges 10 and 48 and the holding means 14 and 52. When this has been done, the equipment can be rotated around the projections 12 and 50. When the proper attitude and position has been attained the bolts 22 and 54 are again tightened and the vibratory equipment is held in that position.

By use of this invention a simple and sure support for vibratory equipment is provided that will permit relatively unimpeded movement to some extent but will not permit undue vibration of the device. Furthermore it provides a mounting device which permits quick changes in the attitude or position of the vibratory equipment.

Whereas two preferred forms of the invention have been shown and described in the drawing and accompanying description, it is obvious to those skilled in the art that various changes in the form of the invention may be made without affecting the scope of the invention.

What I claim is:

1. A mounting device for vibratory equipment comprising a stationary member, a hollow projection on said stationary member, a vibratory member, a hollow projection on said vibratory member, said projections having their ends extending toward each other, a resilient member positioned within each of said hollow projections, a resilient sleeve that receives and telescopes over the inwardly extending ends of said projections, and a member that is secured to the resilient members in said hollow projections and extends through said resilient sleeve to hold said stationary member and said vibratory member in engagement with said resilient sleeve.

2. A mounting device for vibratory equipment comprising a stationary member, a hollow projection on said stationary member, a vibratory member, a hollow projection on said vibratory member, said projections having their ends extending toward each other, a resilient member positioned within each of said hollow projections, a resilient sleeve that receives and telescopes over the inwardly extending ends of said projections, and a connecting member that is secured to the resilient members in said hollow projections and extends through said resilient sleeve to hold said stationary member and said vibratory member in engagement with said resilient sleeve, said projections having sides that parallel the interior surface of said sleeve and are adapted to assist said sleeve to resist side thrust, said sleeve enclosing and protecting said projections and said connecting member.

3. A mounting device for vibrating equipment that comprises a stationary member, a holding member on said stationary member, a vibrating member, a holding member on said vibrating member, a resilient member carried by said stationary member, a resilient member carried by said vibrating member, a hollow resilient member positioned between and contacting said stationary and vibrating members, said hollow resilient member being positioned immediately adjacent said holding members on said stationary and vibrating members and being adapted to limit sideways movement of said resilient member, and a member that engages the resilient members carried by said stationary and vibrating members and holds said resilient members in continuous engagement with said vibrating and stationary members and also holds said stationary and vibrating members in continuous engagement with said hollow resilient member.

LEWIS E. SOLDAN.

REFERENCES CITED

The following references are of record in the file of this patent:

UNITED STATES PATENTS

| Number | Name | Date |
|---|---|---|
| 1,089,748 | Clark | Mar. 10, 1914 |
| 1,880,280 | Replogle | Oct. 4, 1932 |
| 2,270,335 | Parkinson | Jan. 20, 1942 |
| 2,368,727 | Robinson | Feb. 6, 1945 |
| 2,377,492 | Gorton | June 5, 1945 |

FOREIGN PATENTS

| Number | Country | Date |
|---|---|---|
| 536,669 | Germany | May 4, 1930 |
| 808,030 | France | Jan. 27, 1937 |